United States Patent
Kemmer et al.

(10) Patent No.: US 11,473,583 B2
(45) Date of Patent: Oct. 18, 2022

(54) TURBO COMPRESSOR, IN PARTICULAR FOR A FUEL CELL SYSTEM

(71) Applicant: Robert Bosch GmbH, Stuttgart (DE)

(72) Inventors: Helerson Kemmer, Vaihingen (DE); Mark Hellmann, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 16/766,101

(22) PCT Filed: Nov. 14, 2018

(86) PCT No.: PCT/EP2018/081197
§ 371 (c)(1),
(2) Date: May 21, 2020

(87) PCT Pub. No.: WO2019/101593
PCT Pub. Date: May 31, 2019

(65) Prior Publication Data
US 2021/0372412 A1  Dec. 2, 2021

(30) Foreign Application Priority Data

Nov. 22, 2017 (DE) ............. 10 2017 220 855.4

(51) Int. Cl.
*F04D 17/12* (2006.01)
*F04D 25/02* (2006.01)
(Continued)

(52) U.S. Cl.
CPC ........... *F04D 17/12* (2013.01); *F04D 25/024* (2013.01); *F04D 25/06* (2013.01); *F04D 29/057* (2013.01);
(Continued)

(58) Field of Classification Search
CPC ........ F04D 17/12; F04D 25/024; F04D 25/06; F04D 29/057; H01M 8/04111; F05D 2220/40; Y02E 60/50
(Continued)

(56) References Cited

U.S. PATENT DOCUMENTS 6,324,848 B1 * 12/2001 Gladden ................. F02B 37/16
416/198 A
6,357,234 B1 * 3/2002 Gladden ................. F02B 39/16
416/198 A
(Continued)

FOREIGN PATENT DOCUMENTS

CN    106571479 A    4/2017
DE    10322296 A1   12/2004
(Continued)

OTHER PUBLICATIONS

International Search Report for Application No. PCT/EP2018/081197 dated Feb. 13, 2019 (English Translation, 3 pages).

*Primary Examiner* — J. Todd Newton
(74) *Attorney, Agent, or Firm* — Michael Best & Friedrich LLP

(57) ABSTRACT

The invention relates to a turbo compressor (10), in particular for a fuel cell system (1). The turbo compressor (10) has a first compressor unit (101) and a second compressor unit (102). The first compressor unit (101) comprises a first compressor (11) arranged on a first shaft (14) drivable by a drive unit (20). The second compressor unit (102) comprises a second compressor (12) and an exhaust gas turbine (13). The second compressor (12) and the exhaust gas turbine (13) are arranged on a second shaft (24).

18 Claims, 7 Drawing Sheets

(51) Int. Cl.
*F04D 25/06* (2006.01)
*F04D 29/057* (2006.01)
*H01M 8/04111* (2016.01)

(52) U.S. Cl.
CPC ..... *H01M 8/04111* (2013.01); *F05D 2220/40* (2013.01)

(58) Field of Classification Search
USPC .................................................. 60/605.1, 612
See application file for complete search history.

(56) References Cited

U.S. PATENT DOCUMENTS

| | | | |
|---|---|---|---|
| 11,143,096 B2* | 10/2021 | Wengert | F01D 25/125 |
| 2004/0151964 A1* | 8/2004 | Finger | H01M 8/04111 |
| | | | 429/513 |
| 2005/0095488 A1* | 5/2005 | Formanski | H01M 8/04089 |
| | | | 417/244 |
| 2012/0328968 A1 | 12/2012 | Honda | |
| 2012/0328969 A1* | 12/2012 | DeWald | F04D 25/166 |
| | | | 415/66 |

FOREIGN PATENT DOCUMENTS

| | | | |
|---|---|---|---|
| DE | 102010035725 | 3/2012 | |
| DE | 102011109339 | 2/2013 | |
| DE | 102011109339 A1 * | 2/2013 | ........ H01M 8/04089 |
| DE | 112012003213 | 7/2014 | |
| DE | 102014211127 | 12/2015 | |
| DE | 102017205704 | 10/2018 | |
| JP | S6220604 A | 1/1987 | |
| JP | 2005507136 A | 3/2005 | |
| JP | 2005135910 A | 5/2005 | |
| JP | 2007280676 A | 10/2007 | |
| JP | 2009140757 A | 6/2009 | |
| JP | 2010270700 A | 12/2010 | |
| JP | 2012164457 A | 8/2012 | |
| JP | 5056432 | 10/2012 | |
| JP | 2014089930 A | 5/2014 | |
| JP | 6200127 | 9/2017 | |
| WO | WO-03040567 A1 * | 5/2003 | ............. F04D 17/12 |
| WO | 2013011839 A1 | 1/2013 | |
| WO | 2015128936 A1 | 9/2015 | |
| WO | 2016124575 | 8/2016 | |

* cited by examiner

Prior Art

TURBO COMPRESSOR, IN PARTICULAR FOR A FUEL CELL SYSTEM

BACKGROUND OF THE INVENTION

Turbo compressors for a fuel cell system are disclosed by the prior art, for example by the previously unpublished DE 10 2017 205 704 A1. The known turbo compressor comprises a shaft that can be driven by a drive unit. Two compressors and an exhaust gas turbine are arranged on the shaft.

SUMMARY OF THE INVENTION

The turbo compressor according to the invention in contrast has an increased efficiency and dynamic, particularly when it is used in a fuel cell system. Furthermore, in developed embodiments it is capable of reducing the bearing load stress.

For this purpose, the turbo compressor comprises a first compressor unit and a second compressor unit. The first compressor unit comprises a first compressor arranged on a first shaft driven by a drive unit. The second compressor unit comprises a second compressor and an exhaust gas turbine. The second compressor and the exhaust gas turbine are arranged on a second shaft.

This means that the speed of the first compressor does not depend on the speed of the second compressor and that of the exhaust gas turbine. The pressure or mass flow generated by the first compressor therefore becomes independent of the pressure or mass flow generated by the second compressor, according to whether the two compressors are connected in parallel or in series. The turbo compressor is thereby firstly more flexible in its operating points, and secondly it can reach the operating points more rapidly.

The two compressors and the exhaust gas turbine are preferably designed as radial-flow impellers, which are highly efficient both in compressor mode and in expansion mode.

In preferred embodiments the second shaft can be driven by a second drive unit. The second compressor unit can thereby be boosted by the second drive unit. Depending on the type of turbo compressor, the first compressor or the second compressor may be embodied as main compressor and accounts for most of the mass flow thereby delivered. The other compressor in either case is then embodied as auxiliary compressor and may be activated at peak loads, for example, or assisted by the second drive unit. In this embodiment the turbo compressor is especially flexible with regard to its load points. The compressor embodied as main compressor—or its drive unit—is preferably operated with a high voltage, and the compressor embodied as auxiliary compressor—or its drive unit—with a low voltage. The high voltage is preferably 48V and the low voltage 12V.

In advantageous developments the drive unit—and optionally also the second drive unit—therefore each comprise a stator and a rotor, that is to say they are preferably embodied as electric motors. The two compressor units can thereby be activated very rapidly, and it is possible to vary the speeds of the first shaft and the second shaft very rapidly, which gives the turbo compressor a high dynamic.

The presence of the second drive unit also means that a fault on the high-voltage compressor does not inevitably lead to a failure of the fuel cell system. Also, the low-voltage compressor, depending on its thermal design configuration, can deliver a reduced air mass flow over a longer period and thereby allow at least emergency running of the fuel cell system.

The first drive unit is more preferably embodied as a high-voltage electric motor and the second drive unit as a low-voltage electric motor. The drive to the first compressor unit from an electric motor is thereby relatively powerful. In normal operation the second compressor unit is preferably driven mainly by the exhaust gas turbine; for peak loads, however, the second drive unit may be activated in order to boost the second compressor.

In advantageous embodiments the first compressor and the second compressor are connected in parallel. One compressor can thereby be embodied as auxiliary compressor, which delivers an additional mass flow for peak loads.

In alternative advantageous embodiments the first compressor and the second compressor are connected in series. The pressure of the delivered fluid can thereby be further increased in a two or multistage compression.

In an advantageous development a heat exchanger is arranged between the first compressor and the second compressor. The heat exchanger serves for cooling the fluid delivered by the two compressors. This serves to increase the efficiency of the compression.

In preferred embodiments the second shaft is supported by at least one shaft bearing. The first compressor and the second compressor are arranged in an air feed line. Between the first compressor and the second compressor a bearing line branches off from the air feed line to supply the shaft bearing with fluid pressure. At least the one shaft bearing here is preferably embodied as a gas bearing, which is supplied with the pressurized fluid delivered by the first compressor. This fluid pressure serves to build up a fluid-dynamic lubricating film in the shaft bearing, so that the wear in the shaft bearing is reduced or even eliminated. By means of the second compressor on the downstream side the fluid is then brought to the required pressure, for example in order to supply a fuel cell with an oxidizing agent. The fluid can furthermore also be used for cooling the shaft bearing.

In advantageous developments a bearing line valve is arranged in the air feed line between the point where the bearing line branches off and the second compressor. The bearing line valve can thus open or block the mass flow of fluid into the second compressor. This serves to ensure that the second compressor, and with it the second shaft, rotates only when the shaft bearing is subjected to an adequate fluid pressure.

A method for starting a fuel cell system accordingly comprises the following steps in the method:
- the bearing line valve is or remains closed,
- the delivery of the oxidizing agent in the air feed line is then started due to starting of the drive unit,
- finally, the bearing line valve is opened when a minimum pressure in the shaft bearing is reached.

The minimum pressure here is preferably between 1.5 bar and 2.0 bar. The fuel cell system here comprises a fuel cell, an air feed line for feeding an oxidizing agent into the fuel cell and an exhaust line for discharging the reacted oxidizing agent from the fuel cell. The fuel cell system further comprises a turbo compressor as described above, in particular having the shaft bearing, the bearing line and the bearing line valve. The fluid delivered by the turbo compressor is therefore the oxidizing agent.

Similarly, a method for stopping the fuel cell system comprises the following steps in the method:
- the bearing line valve is closed, the drive unit is then stopped when the speed of the second shaft falls below a speed limit.

The speed limit here lies in the range from 0 to 5,000 revolutions, which corresponds to a low speed for an exhaust turbocharger. The methods for starting and stopping the fuel cell system mean that the shaft bearing is operated with exceptionally little wear, since sufficient fluid pressure is always formed to support a fluid-dynamic lubricating film in the shaft bearing. Furthermore, the shaft bearing can also be cooled by the oxidizing agent, particularly if a heat exchanger for cooling the fluid is arranged between the first compressor and the branch to the bearing line.

In advantageous embodiments the first compressor and the second compressor are arranged in an air feed line of a fuel cell system, and the exhaust gas turbine in an exhaust line of the fuel cell system. The air feed line here serves for the admission flow of oxidizing agent into a fuel cell, and the exhaust line serves for discharging the oxidizing agent or the reacted oxidizing agent or a mixture thereof from the fuel cell.

In preferred developments of the turbo compressor a third compressor is arranged on the first shaft. This may be connected to the first compressor in parallel or in series, depending on whether a further compression stage or an increase in the mass flow is to be achieved.

Accordingly, the first compressor, the second compressor and the third compressor are advantageously arranged in an air feed line of a fuel cell system and the exhaust gas turbine in an exhaust line of the fuel cell system.

In particularly advantageous embodiments a compressor bypass valve is arranged in parallel with the second compressor. This allows the mass flow of the fluid or oxidizing agent being delivered to be either directed through the second compressor or led through a compressor bypass circumventing the second compressor. Intermediate settings for precise proportioning of the mass flow through the second compressor are also possible; this is advantageous particularly where the second compressor is connected in parallel with the first compressor. If the second compressor is driven by the second drive unit, it can be bypassed by the bypass valve to save energy when the operating point of the turbocharger does not require the use of the second compressor. Furthermore, the compressor bypass valve can also be used for advantageous start-stop strategies.

In further advantageous embodiments an exhaust bypass valve is arranged in parallel with the exhaust gas turbine. This allows the mass flow of the fluid or reacted oxidizing agent being delivered to be either directed through the exhaust gas turbine or led through an exhaust bypass circumventing the exhaust gas turbine. Intermediate settings for precise proportioning of the mass flow through the exhaust gas turbine are also possible; this is advantageous particularly when braking the second compressor unit.

A method for starting a fuel cell system accordingly comprises the following steps in the method:
the compressor bypass valve and the exhaust bypass valve are or remain opened,
the delivery of the oxidizing agent in the air feed line then starts due to starting of the drive unit,
finally, the compressor bypass valve and the exhaust bypass valve are closed when the minimum pressure in the shaft bearing is reached.

The minimum pressure here is preferably between 1.5 bar and 2.0 bar. The fuel cell system here comprises a fuel cell, an air feed line for feeding an oxidizing agent into the fuel cell and an exhaust line for discharging the reacted oxidizing agent from the fuel cell. The fuel cell system further comprises a turbo compressor as described above, in particular having the shaft bearing, the bearing line and the compressor bypass valve and the exhaust bypass valve. The fluid delivered by the turbo compressor is therefore the oxidizing agent.

Similarly, a method for stopping the fuel cell system comprises the following steps in the method:
the compressor bypass valve and the exhaust bypass valve are opened,
the drive unit is then stopped when the speed of the second shaft falls below a speed limit.

The speed limit here lies in the range from 0 to 5,000 revolutions, which corresponds to a low speed for an exhaust turbocharger. The methods for starting and stopping the fuel cell system mean that the shaft bearing is operated with exceptionally little wear, since sufficient fluid pressure is always formed to support a fluid-dynamic lubricating film in the shaft bearing. Furthermore, the shaft bearing can also be cooled by the oxidizing agent, particularly if a heat exchanger for cooling the fluid is arranged between the first compressor and the branch to the bearing line.

A compressed-air brake is advantageously arranged on the second shaft, the compressed-air brake being connected to the bearing line. Since the compressor bypass line and the exhaust bypass line may have a certain pressure loss, in these cases fluid is able to flow through the exhaust turbocharger and start the latter even with the bypass valves fully opened. It is for just this reason that the compressed-air brake is fitted on the second shaft. It is released only when a pressure threshold is reached, which preferably exceeds the minimum supply pressure of the shaft bearing, so that starting of the second shaft is prevented when the fluid pressure in the shaft bearing is low.

The embodiments of the turbo compressor described are preferably used in a fuel cell system. The fuel cell system comprises a fuel cell, an air feed line for feeding an oxidizing agent into the fuel cell and an exhaust line for discharging the oxidizing agent from the fuel cell. All or some of the discharged oxidizing agent here may have chemically reacted in the fuel cell. The compressor and the second compressor of the turbo compressor are arranged in the air feed line. And the exhaust gas turbine of the turbo compressor is arranged in the exhaust line. The two pressure stages and the aggregated mass flows of oxidizing agent through the two compressors are especially effective in the air feed line. Furthermore, in this way the shaft bearings of the first shaft and/or of the second shaft can also be lubricated and cooled by the oxidizing agent, especially if a heat exchanger is preconnected. The reacted oxidizing agent flowing out of the fuel cell can be used very efficiently as power source for the exhaust gas turbine.

The fuel cell system may preferably be adapted to power a drive unit of a motor vehicle.

BRIEF DESCRIPTION OF THE DRAWINGS

Further optional details and features of the invention emerge from the following description of preferred exemplary embodiments, which are represented schematically in the figures, of which.

DETAILED DESCRIPTION

Figure 1:
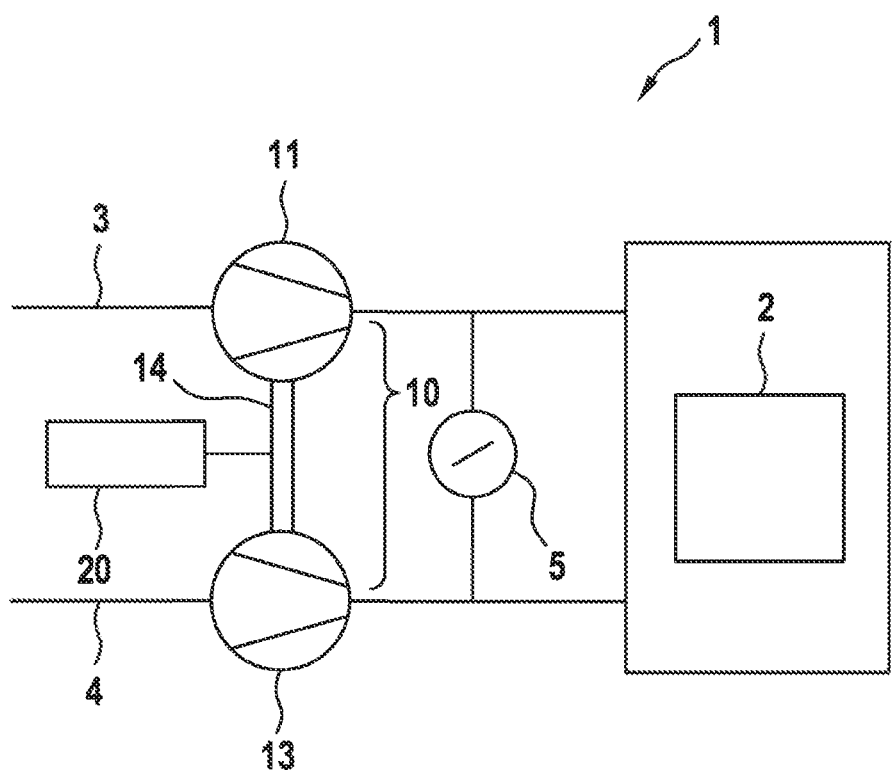
FIG. 1 schematically shows a fuel cell system having a turbo compressor of prior art, FIG. 2 schematically shows a section through a turbo compressor of prior art.

FIG. 1 shows a fuel cell system 1 disclosed by DE 10 2017 205 704 A1. The fuel cell system 1 comprises a fuel cell 2, and air feed line 3, an exhaust line 4, a compressor 11, an exhaust gas turbine 13, a bypass flap 5 for reducing pressure and a fuel feed line, not shown in more detail, to the fuel cell 2. The bypass valve 5 may be a control flap, for example. A wastegate valve, for example, may be used as bypass flap 5.

The fuel cell 2 is a galvanic cell, which converts chemical reaction energy of a fuel fed via the fuel feed line (not shown), and an oxidizing agent into electrical energy, the agent in the embodiment shown here being intake air, which is fed to the fuel cell 2 via the air feed line 3. The fuel may preferably be hydrogen or methane or methanol. The fuel cell 2 is adapted, for example, to power a drive unit of a motor vehicle. For example, the electrical energy generated by the fuel cell 2 here powers an electric motor of the motor vehicle.

The compressor 11 is arranged in the air feed line 3. The exhaust gas turbine 13 is arranged in the exhaust line 4. The compressor 11 and the exhaust gas turbine 13 are mechanically connected via a shaft 14. The shaft 14 can be electrically driven by a drive unit 20. The exhaust gas turbine 13 serves to support the drive unit 20 in driving the shaft 14 and the compressor 11. The compressor 11, the shaft 14 and the exhaust gas turbine 13 together form a turbo compressor 10.

Figure 2:
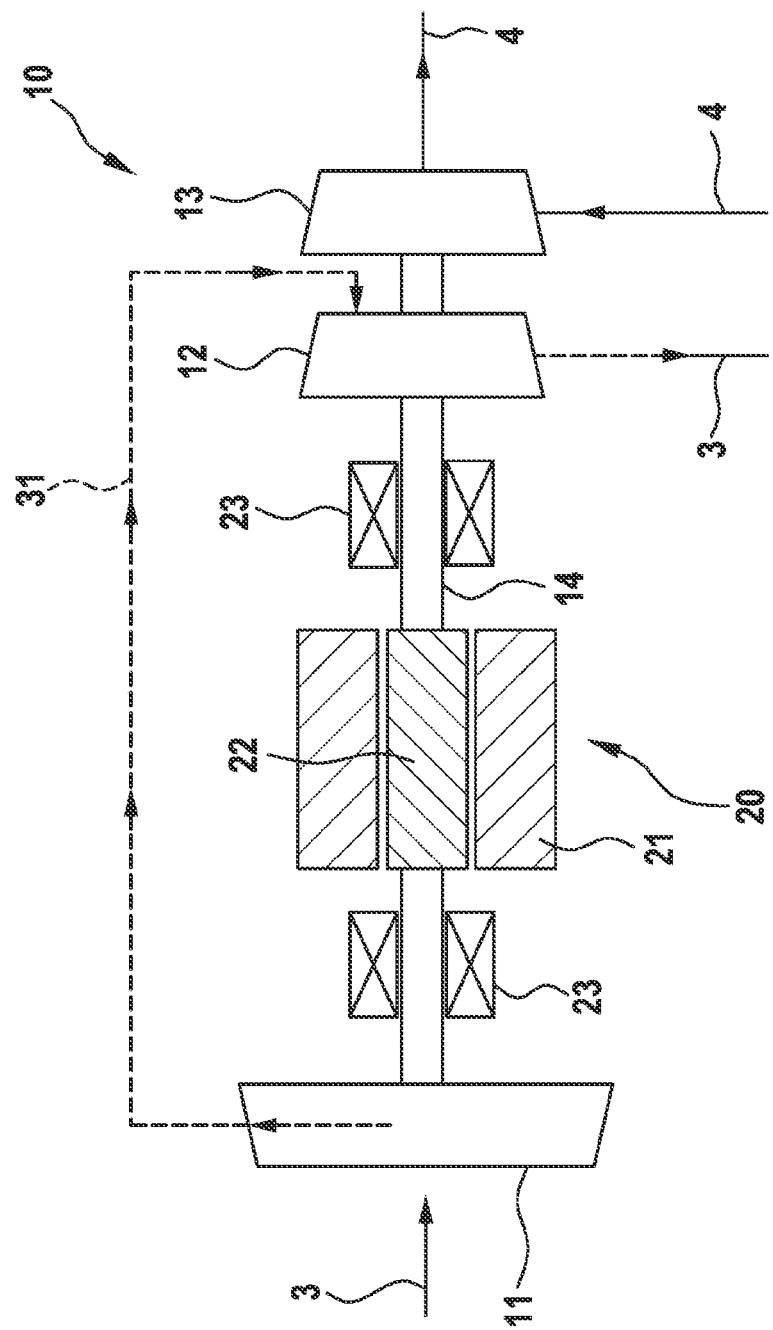

FIG. 2 likewise shows a turbo compressor disclosed by DE 10 2017 205 704 A1, particularly for use in a fuel cell system 1. The turbo compressor 10 comprises the drive unit 20, the first compressor 11, the exhaust gas turbine 13 and a second compressor 12. The first compressor 11, the second compressor 12 and the exhaust gas turbine 13 are arranged on a common shaft 14, so that they rotate in the same way as the shaft 14 rotates.

The drive unit 20 is embodied as an electric motor and comprises a rotor 22 and a stator 21. The rotor 22 is likewise arranged on the shaft 14. The stator 21 is immovably positioned in a housing (not shown) of the turbo compressor 10. The shaft 14 is supported by means of a bearing 23 on each of the two sides of the drive unit 20.

An air duct 31 is designed as part of the air feed line 3 so that it leads from outside into the turbo compressor 10, where it opens axially into the first compressor 11 and leads radially out of the first compressor 11, continues to the second compressor 12, where it likewise opens axially into the second compressor 12 and leads radially out of the second compressor 12 and then leads out of the turbo compressor 10. Thereafter the air feed line 3 leads into the fuel cell 2, which however is not represented in FIG. 2.

The exhaust line 4 in turn leads from the fuel cell 2 into the turbo compressor 10, where it opens radially into the exhaust gas turbine 13 and leads axially out of the exhaust gas turbine 13, before then leading back out of the turbo compressor 10.

Through the use of the second compressor 12, the air drawn in via the air feed line 3—or the aspirated oxidizing agent—can be more strongly compressed than if only a single compressor 11 were provided in the turbo compressor 10.

Furthermore, in their flow ducting and pressure gradients the first compressor 11, the second compressor 12 and the exhaust gas turbine 13 can be designed in such a way that the resulting axial force acting on the shaft 14 in the operation of the turbo compressor 10 is virtually zero. The turbo compressor 10 is thereby pressure-balanced, so that the bearings have to absorb virtually no axial forces.

Figure 3:
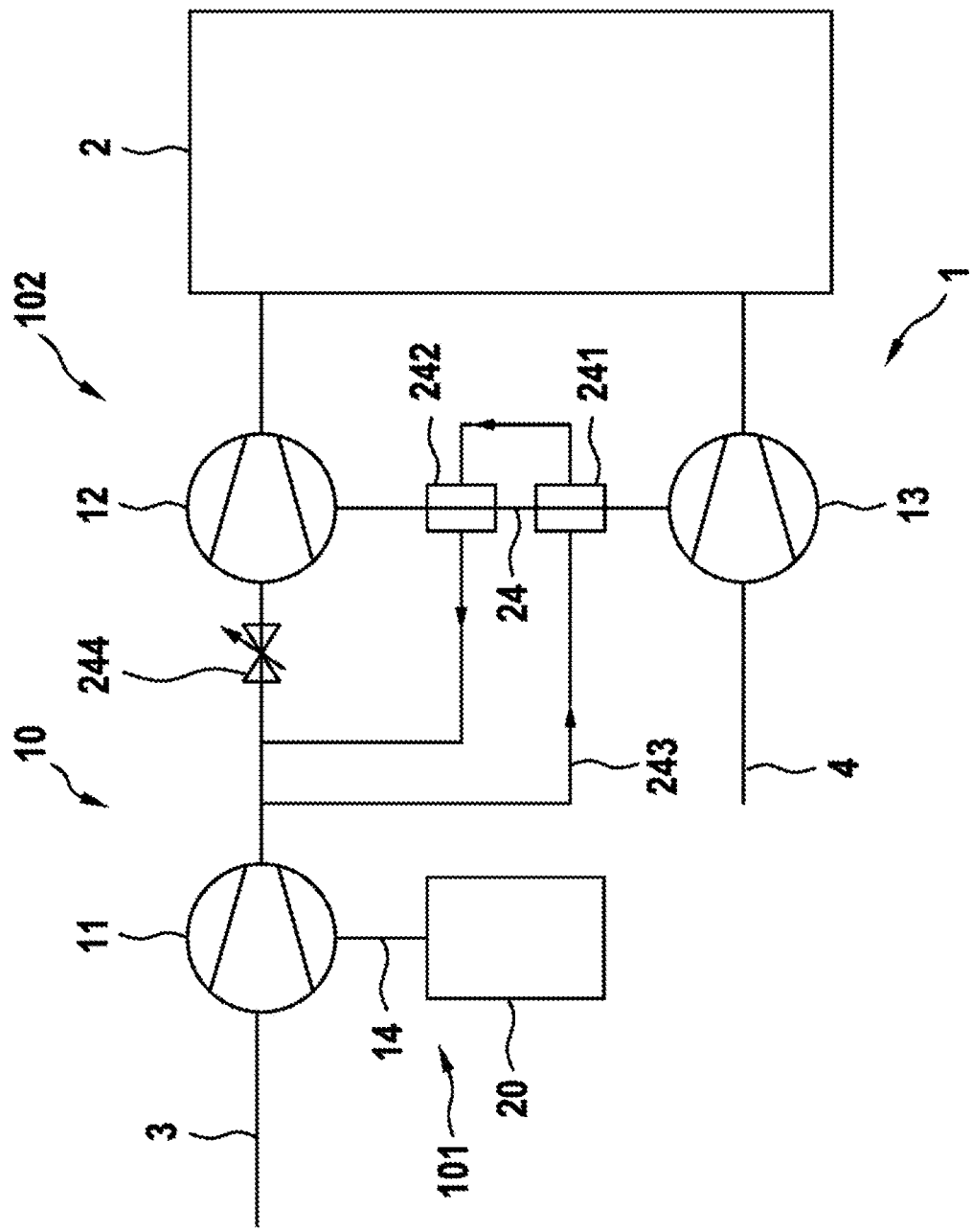
FIG. 3 schematically shows a turbo compressor according to the invention in a fuel cell system, representing only the main areas.

FIG. 3 shows a turbo compressor 10 according to the invention in a fuel cell system 1. The turbo compressor 10 comprises a first compressor unit 101 and a second compressor unit 102. The first compressor unit 101 comprises the first compressor 11, a first shaft 14 and the drive unit 20, the first compressor 11 being arranged on the first shaft 14 and the first shaft 14 being driven by the drive unit 20; the drive unit 20 here is preferably an electric motor. The second compressor unit 102 comprises the second compressor 12, a second shaft 24 and the exhaust gas turbine 13, the second compressor and the exhaust gas turbine 13 being arranged on the second shaft 24.

The first compressor 11 and the second compressor 12 are preferably embodied as radial-flow impellers. They are arranged in series in the air feed line 3 but in alternative embodiments they may also be arranged connected in parallel in the air feed line 3. The second shaft 24 is driven by the exhaust gas turbine 13, through which the exhaust gas or the reacted oxidizing agent flows in the exhaust line 4. The second compressor unit 102 is therefore embodied as an exhaust turbocharger.

The air pressure of 3 bar, for example, required for the fuel cell 2 is therefore generated in two stages, preferably with a first pressure ratio of the electrically driven compressor 11 of $\pi_{11}=1.8$ and a second pressure ratio of the second compressor 12 likewise of $\pi_{12}=1.8$. the fuel cell 2 can thus be operated at more than 3 bar, a pressure ratio of approximately 3 thereby being available to the exhaust gas turbine 13 for driving the second compressor unit 102—and generation of the second pressure ratio $\pi_{12}=1.8$. This high pressure ratio enables the exhaust gas turbine 13 to drive the second compressor 12.

The two compressors 11, 12 are thereby designed for more moderate pressure ratios than in the reference case of a single-stage compressor. The design possibilities are therefore greater and more robust; owing to the lower circumferential speed of the compressors 11, 12, preferably designed as radial-flow impellers, more cost-effective materials can therefore be used.

An optimum speed can also be selected in each instance: a lower speed for the electrically driven first compressor 11 (for example approximately 70,000 revolutions per minute), a significantly higher speed for the second compressor 12 (for example approximately 200,000 revolutions per minute). The bearing concept of the first compressor unit 101 can therefore be simplified, and rolling-contact bearings can be used. Furthermore, the drive by means of the drive unit 20 is more favorably achievable, since the power demand is lower and the drive frequencies are reduced. The second compressor unit 102 on the other hand can be operated with optimum efficiency. The available exhaust gas enthalpy in the exhaust line 4 can be utilized more efficiently.

The lower power demand of the drive unit 20 makes it possible to reduce the power allowance in the fuel cell 2, with a positive effect on the costs of the fuel cell system 1. The fuel consumption—for example hydrogen—also drops, because the parasitic power is reduced.

The concept according to the invention reduces the moment of inertia of the first compressor 11 of the first compressor unit 101, because the electrically driven compression is less than in the reference case of single-stage compression. The power electronics of the first compressor unit 101 can thereby of smaller dimensions, because its design is dependent on the acceleration of the drive unit 20, in particular of a rotor. In the acceleration, the drive unit 20 briefly delivers an increased torque. For the power electronics this means an increased current, with consequences for the chip area and the cooling concept. The acceleration requirements are expressed as so-called t90 acceleration times. A typical requirement is t90_max=1.0 s.

The two-stage compression by means of the first compressor 11 and the second compressor 12 mean that a further increase in pressure in the fuel cell 2 is achievable, for example to 4 bar. This improves the internal wetting of the fuel cell 2, making it feasible to possibly dispense with an external humidifier, with positive effects on the costs of the fuel cell system 1. At the same time both compressors 11, 12 remain of manageable design and the power recuperation by the exhaust gas turbine 13 is further increased.

In advantageous developments the embodiments in FIG. 3 comprise yet another bearing line 243, which branches off from the air feed line 3 between the first compressor 11 and the second compressor 12. The bearing line 243 serves for the lubrication and cooling of shaft bearings 241, 242, which support the second shaft 24. The bearing line 243 here may lead back into the air feed line 3 upstream of the second compressor 12, as shown in FIG. 3, or it may be designed as a branch line.

Since the second compressor unit 102 is preferably embodied as a turbocharger and the speed of the second shaft 24 is consequently very high, the shaft bearings 241, 242 are preferably designed as gas bearings. The gas bearing has an aerostatic action at least some of the time, that is to say it prevents contact between the second shaft 24 and the components of the shaft bearings 241, 242 due to the supply of external air pressure via the bearing line 243.

The second shaft 24 moves only when a pressure ratio prevails over the exhaust gas turbine 13. This is possible only when the first compressor 11 driven by the drive unit 20 is activated. Due to the pressure loss in the system, an air back-pressure is produced in the area of the shaft bearings 241, 242 for supplying them.

In order to increase this back-pressure further, a bearing line valve 244 may be fitted upstream of the second compressor 12. The bearing line valve 244 may be embodied as a throttle valve, for example, or as a check valve. A method for controlling the turbo compressor 10 when running up here provides for the following steps: if the air delivery or the delivery of oxidizing agent through the air feed line 3 is to be started, the bearing line valve 244 is first fully closed. The air delivery via the driven first compressor 11 is started. Only when an air pressure sufficient for the operation of the shaft bearings 241, 242 is reached is the bearing line valve 244 controllably opened. Controlling this ensures that the air pressure in the bearing area of the shaft bearings 241, 242 is always in excess of the necessary threshold or the minimum pressure.

A further method for running the turbo compressor 10 down is as follows: the bearing line valve 244 is first closed, so that the delivery of the oxidizing agent into the fuel cell 12 is terminated. Only when the speed of the second shaft 24 is consequently equal to zero, because there is no mass flow of reacted oxidizing agent to the exhaust gas turbine 13, is the operation of the driven compressor 11 ceased, in that the drive unit 20 no longer drives the first shaft 14.

If the bearing line valve 244 is embodied as a check valve, this ensures that only when its release pressure is exceeded does air flow to the fuel cell 2 via the second compressor 12. This release pressure preferably exceeds the supply pressure or minimum pressure of the shaft bearings 241, 242. It is thereby ensured that the second shaft 24 rotates only when the shaft bearings 241, 242 are already supplied with pressure. A mixed friction is ideally thereby entirely prevented, thereby removing the resulting limitations on the service life of the shaft bearings 241, 242.

Figure 4:
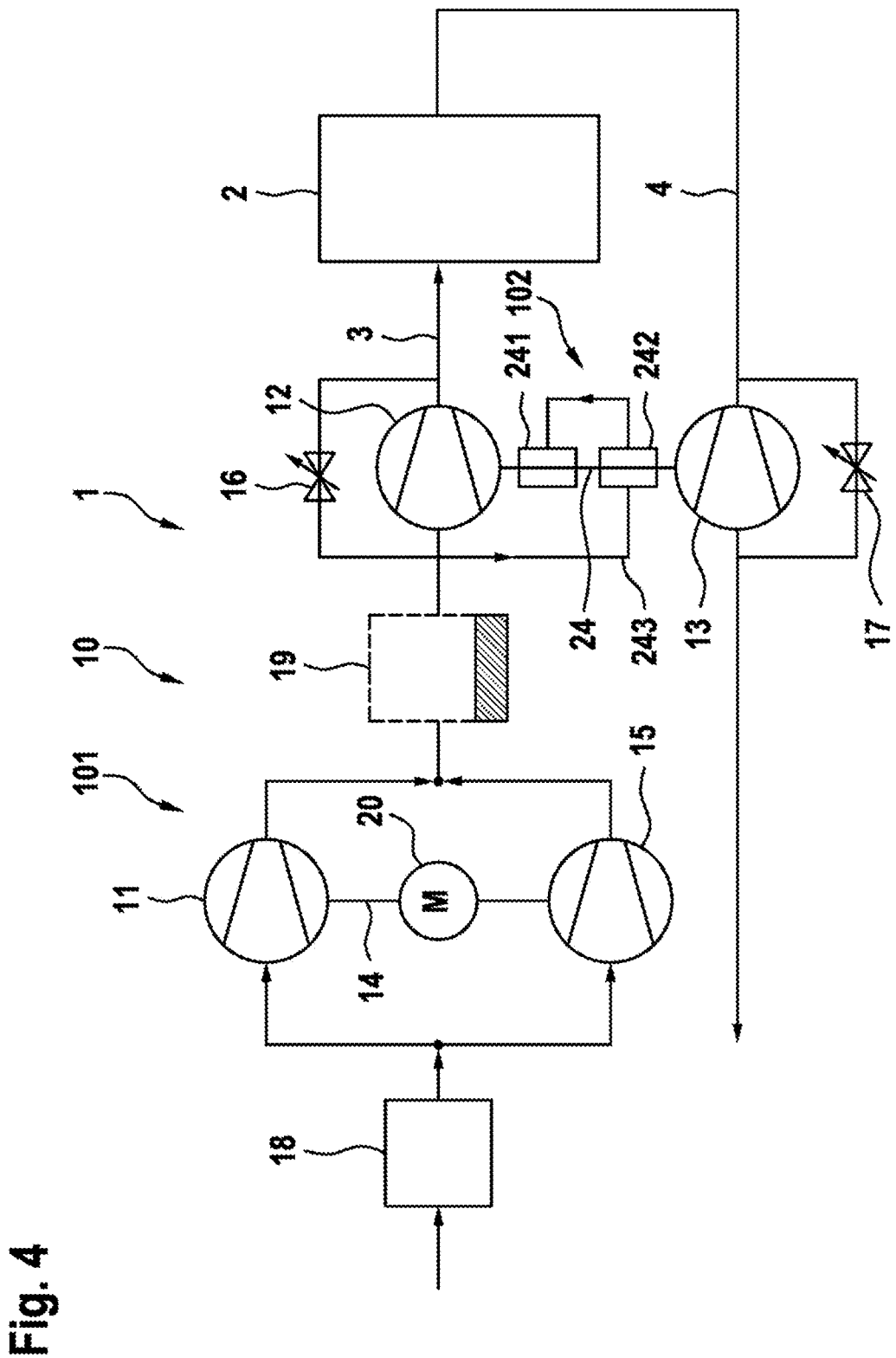
FIG. 4 schematically shows a further turbo compressor according to the invention in a fuel cell system, representing only the main areas.

FIG. 4 shows a further embodiment of a fuel cell system 1 having a turbo compressor 10. In addition to the first compressor 11 the first compressor unit 101 here comprises a third compressor 115, which is likewise positioned on the first shaft 14 and is arranged, connected in parallel to the first compressor 11 in the air feed line 3. Alternatively, the third compressor 15 may also be connected to the compressor 11 in series, so that through interaction with the second compressor 12 on the downstream side a three-stage compression occurs.

The fuel cell system 1 further comprises a filter 18 and a heat exchanger 19. The filter 18 is arranged in the air feed line 3 upstream of the first compressor unit 101, the heat exchanger 19 preferably between the first compressor unit 101 and the second compressor unit 102. The heat exchanger 19 cools the oxidizing agent—or the ambient air—between the first compressor 11 and the second compressor 12, so that the compression in the second compressor 12 can be designed more efficiently.

The arrangement of the first compressor 11 and the third compressor 15 on the first shaft 14 means that the resulting axial forces acting on the first shaft 14 can be reduced or eliminated. The costs for the turbo compressor 10 can thereby be further reduced, particularly the costs for supporting the first shaft 14. Furthermore, the compression or the mass flow can thereby be increased.

If the first compressor 11, the third compressor 15 and the second compressor 12 are connected in series, even higher pressure ratios can be achieved for the fuel cell 2. The individual compressor impellers of the three compressors 11, 12, 15 may alternatively or in addition also be designed for relatively moderate pressure ratios. The design possibilities are therefore greater and more robust; due to the lower circumferential speeds, for example, less expensive materials can also be used for the impellers of the compressors 11, 12, 15.

In advantageous developments the second compressor unit 102 comprises two bypass valves 16, 17 in order to start the fuel cell system 1 and to regulate the pressure in the fuel cell 2: by means of the compressor bypass valve 16 the second compressor 12 of the exhaust turbocharger is bypassed when starting up, until sufficient pressure and mass flow reaches the exhaust gas turbine 13. As soon as the exhaust gas turbine 13 is capable of driving the second compressor 12, the compressor bypass valve 16 is gradually closed. In normal operation the compressor bypass or the compressor bypass valve 16 remains closed, so that the entire mass flow is led through the second compressor 12. The pressure is regulated, in particular, via the second bypass valve, the exhaust bypass valve 17: the exhaust gas mass flow in the exhaust line is at least partially diverted around the exhaust gas turbine 13 if a lower pressure is to be set. The exhaust gas turbine 13 rotates correspondingly slower, the pressure build-up is reduced.

In cold starting under freezing conditions both bypass valves 16, 17 are opened. The flow therefore passes around the exhaust gas turbine, which may possibly be frozen up; the fuel cell system 1 can be operated at reduced pressure generated by the first compressor unit 101. This does not impose operating restrictions, however, since high pressures are not required in the cold system. As soon as the exhaust gas in the exhaust line 4 is warm enough, the exhaust bypass valve 17 is closed somewhat, in order that the warm exhaust gas can thaw the exhaust gas turbine 13. This makes it possible to dispense with additional heaters for thawing the exhaust gas turbine 13; the fuel cell system 1 can be started immediately.

Decoupling the exhaust gas turbine 13 from the first shaft 14 also prevents moisture getting into the drive unit 20 via the exhaust gas turbine 13. As a result, the sealing concept in the turbo compressor 10 is simplified.

Under incremental loads the compressor bypass valve 16 is full opened. It is therefore ensured that the mass flow of oxidizing agent delivered by the first compressor unit 101 reaches the cathode of the fuel cell 2 more rapidly. A higher mass flow can be drawn relatively quickly, the dynamic response is better than that in the reference case of a single-stage compressor, owing to the reduced moment of inertia of the first compressor unit 101. The second compressor 12 is activated only when a higher pressure is required, for example in the event of an increase in the temperature of the fuel cell 2.

The compression in multiple—that is in two or three—stages makes it possible to dispense with pump safeguard measures. The bypass flap 5 of prior art can be dispensed with, the pump safeguard activation strategy is no longer needed, the air mass flow into the fuel cell 2 can be unambiguously measured by a sensor in the low pressure area upstream of the first compressor unit 101.

In advantageous developments the design in FIG. 4 also comprises the bearing line 243 for supplying the shaft bearings 241, 242 with fluid pressure. In the design in FIG. 4 the bearing line is embodied as a branch line, but it may also be led back into the air feed line 3. Combining the bearing line 243 with the compressor bypass valve 16 and the exhaust bypass valve 17 is particularly advantageous, since this prevents accidental starting of the second shaft 24, and thus the control of the fuel cell system 1 can be adjusted so that the second shaft 24 rotates only when its shaft bearings 241, 242 are subjected to an adequate fluid pressure.

An operating strategy for the start-stop process of the turbo charger 10 is as follows: If the air delivery or the delivery of the oxidizing agent in the air feed line 3 to the fuel cell 2 is to be started, the compressor bypass valve 16 and the exhaust bypass valve 17 are first fully opened. Then the first compressor unit 101 is activated, the pressure in the shaft bearings 241, 242 rises due to the back-pressure of the stack in the fuel 2 and other components. Only when the minimum pressure for an adequate supply of the preferably aerostatic bearings 241, 242 has been reached are the compressor bypass valve 16 and the exhaust bypass valve 17 regulated or closed, so that the second shaft 24 rotates and the second compressor unit 102, via the second compressor 12, therefore participates in the supply of oxidizing agent to the fuel cell 2.

A compressed air brake, which is supplied with the fluid via the bearing line 243, is preferably arranged on the second shaft 24. The compressed-air brake is released only from a specific pressure onwards, preferably from the minimum supply pressure of the shaft bearings 241, 242. Operation of the shaft bearings 241, 241 in the mixed friction range is thereby prevented. The service life of the shaft bearings 241, 242 is increased.

Figure 5:
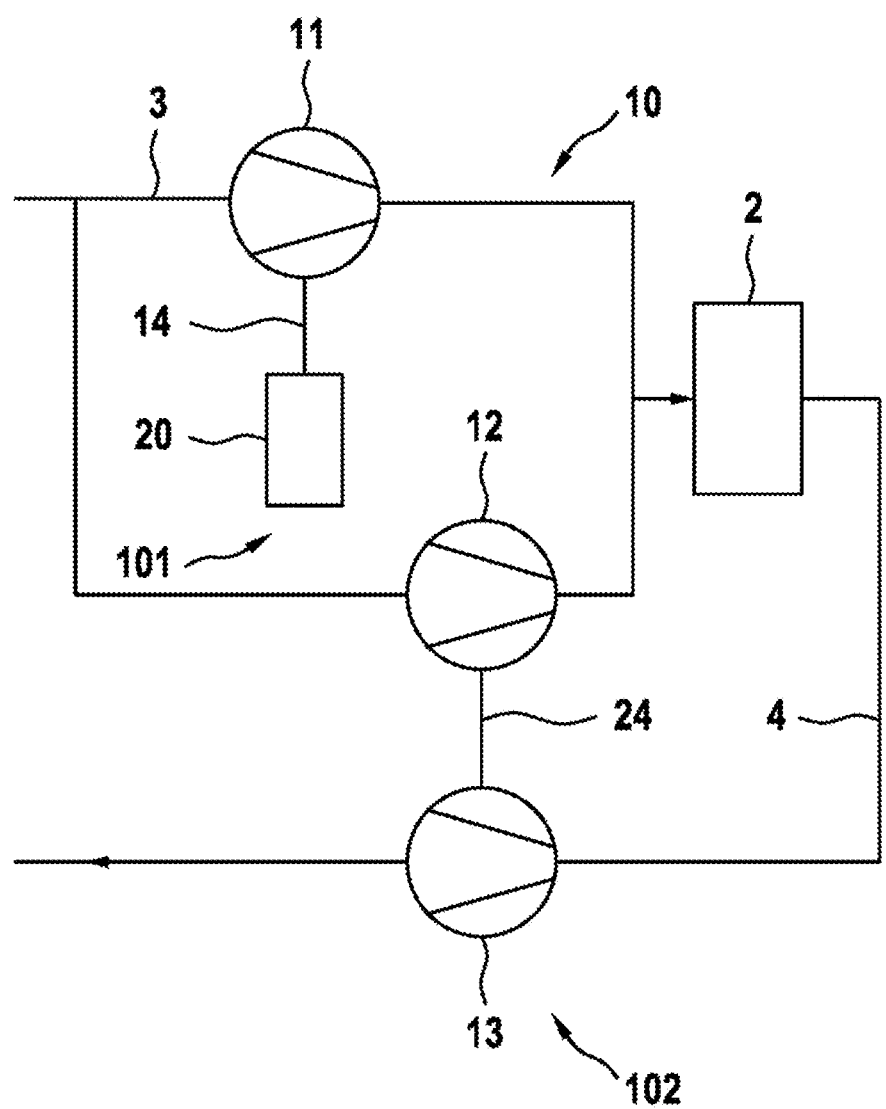
FIG. 5 schematically shows yet a further turbo compressor according to the invention in a fuel cell system, representing only the main areas.

FIG. 5 shows a further embodiment of a fuel cell system 1 having a turbo compressor 10. The turbo compressor 10 comprises the first compressor unit 101 and the second compressor unit 102, the first compressor 11 and the second compressor 12 being connected in parallel in the air feed line 3. The first compressor 11 here is driven by the drive unit 20, preferably an electric motor. The second compressor 12 is driven by the exhaust gas turbine 13, the second compressor unit is therefore embodied as an exhaust turbocharger. For this purpose, the exhaust gas turbine 13 and the second compressor are arranged on the second shaft 24.

The turbo compressor 10 therefore has a twin-scroll compression of the oxidizing agent in the air feed line 3.

The embodiment of the fuel cell system 1 in FIG. 5 is particularly advantageous in the case of a high air mass flow of at least 300 g/s, and a moderate pressure ratio of no more than π=2.

The air mass flow of 300 g/s required for operation of the fuel cell 2 is generated in the two parallel compressors 11, 12, for example with a first air mass flow of 100 g/s, for example, from the electrically powered first compressor 11 , and a second air mass flow of 200 g/s, for example, from the second compressor. The total air mass flow of 300 g/s is then available to the exhaust gas turbine of the exhaust turbocharger.

Bypass valves and a heat exchanger can be used also in the embodiment in FIG. 5, as has been described previously.

Figure 6:
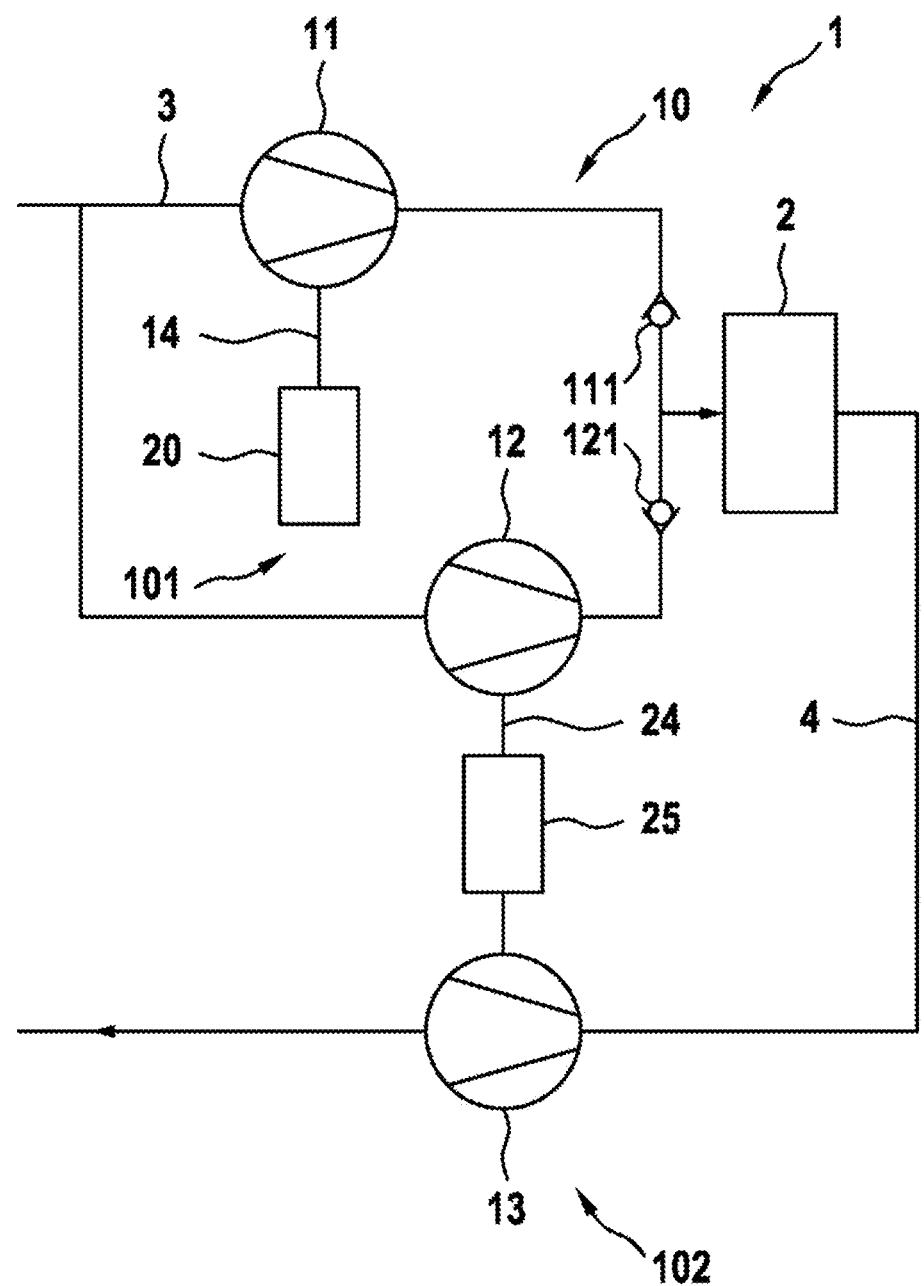
FIG. 6 schematically shows yet a further turbo compressor according to the invention in a fuel cell system, representing only the main areas.

FIG. 6 also shows a parallel connection of the first compressor 11 and the second compressor 12 in the air feed line 3. The first compressor unit 101 comprises the first shaft 14, the first compressor 11 and the drive unit 20, the drive unit 20 preferably being designed as a low-voltage electric motor. The second shaft 24 with the second compressor 12, however, is driven by a second drive unit 25, which is preferably embodied as a high-voltage electric motor. The second compressor unit 102 therefore comprises the second shaft 24, the second compressor 12, the second drive unit 25 and the exhaust gas turbine 13. The second compressor unit 102 is therefore embodied as main compressor, and the first compressor unit 101 as auxiliary compressor. The two compressors 11, 12 each comprise a check valve 111, 121, in order to avoid leakages or a backward flow through respective passive path in the air feed line 3. This may be relevant whenever only one of the two compressors 11, 12 is in operation. In the design in FIG. 6, in normal operation the second compressor unit 102 should be in operation and the first compressor unit 101 should be activated when an increased mass flow of the oxidizing agent is needed for the fuel cell 2.

In order to be able to rapidly generate electrical power with the fuel cell 2, a sufficiently high air mass flow or flow of oxidizing agent in the air feed line 3 is above all necessary. The requirements for the dynamic of the pressure build-up are lower, because the high pressure is required mainly in stationary operation at high system temperatures. A load increment to full load of the fuel cell system 1 noes not necessarily lead to high system temperatures, because the system has a certain thermal inertia. As a result, the dynamic of the second compressor unit 102, which is capable of building up the high pressure, may be much slower than the dynamic of the first compressor unit 101.

From this it follows that the power electronics of the second compressor unit 102 can be designed for continuous power output. This avoids over-dimensioning to cater for the dynamic case and increased component costs.

The first compressor 11 may also be used in normal operation to briefly increase or to boost the pressure. This allows for the possibility of transient loads of the fuel cell system 1 in excess of the continuous thermal output; in this way the pressure and mass flow in the air feed line 3 can be briefly increased.

Figure 7:
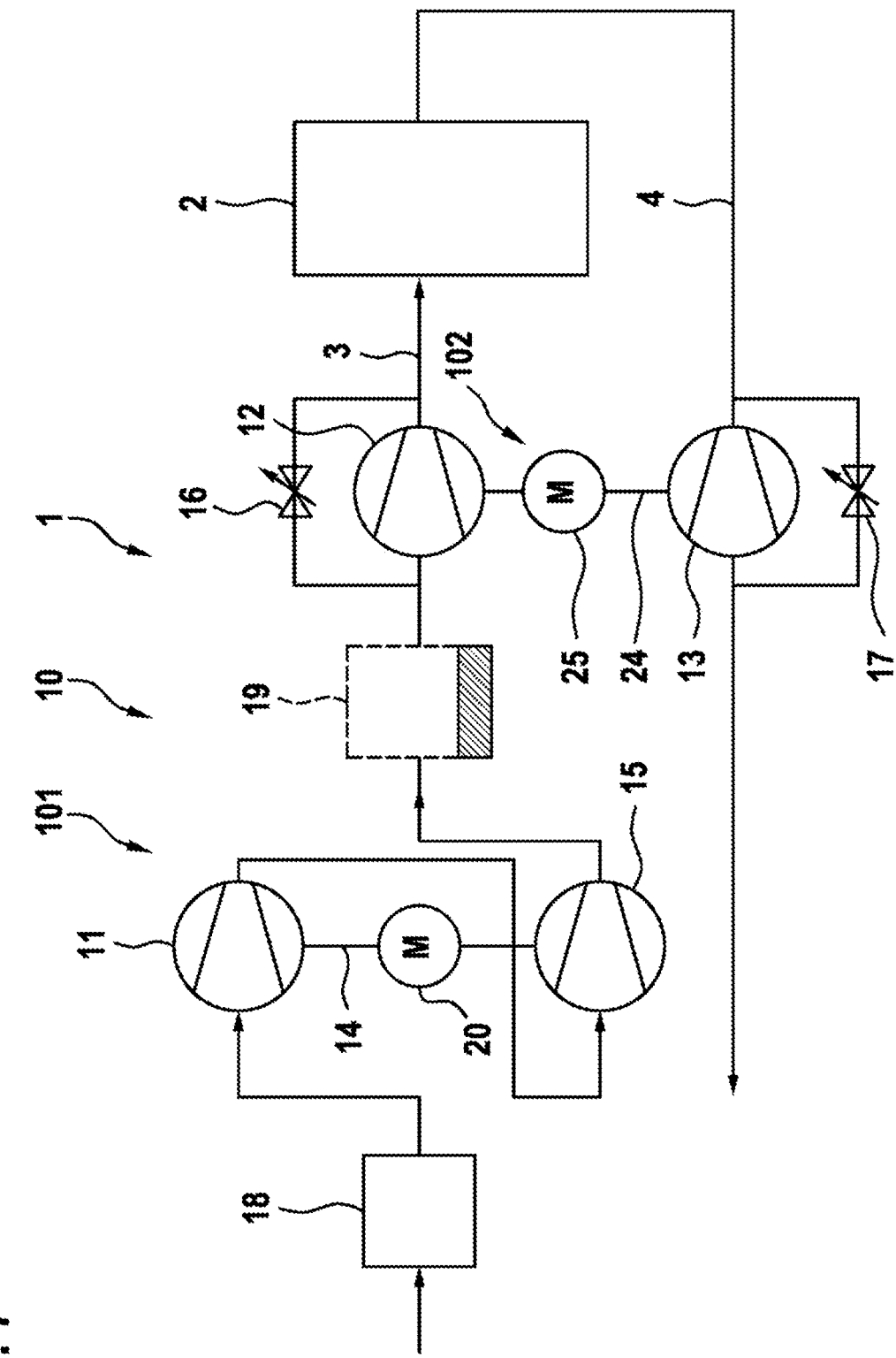
FIG. 7 schematically shows yet a further turbo compressor according to the invention in a fuel cell system, representing only the main areas.

The embodiment in FIG. 7 shows a development of the fuel cell system 1 and of the turbo compressor 10 in FIG. 4. In the embodiment in FIG. 7 the second compressor unit 1202 comprises a second drive unit 25, which is preferably arranged on the second shaft 24 between the exhaust gas turbine 13 and the second compressor 12. Here, as in the embodiment in FIG. 4, the air filter 18, the heat exchanger 19 and the two bypass valves 16, 17—that is to say the compressor bypass valve 16 and the exhaust bypass valve 17—are optional. In the embodiment in FIG. 7 the first compressor 11 and the third compressor 15 of the first compressor unit 101 are connected in series. A connection in parallel would also alternatively be feasible, however; in other embodiments the third compressor 15 can also be dispensed with.

The second compressor unit 102 can be boosted by the second drive unit 25; in the embodiment in FIG. 7 the exhaust gas turbine 13 is therefore supported by the second drive unit 25. The second drive unit 25 is preferably embodied as a low-voltage motor—in particular with an operating voltage of 12V—and the drive unit 20 as a high-voltage motor—in particular with an operating voltage of 48V. The second drive unit 25 renders the second compressor unit 102, embodied as an electrically assisted exhaust turbocharger, independent of the system dynamic of the cathode pressure build-up. The build-up of pressure in the first compressor 11 can therefore be matched to the pressure build-up in the second compressor 12.

The advantages for the fuel cell system 1 due to the second drive unit 25 are as follows:

Higher reliability of the fuel cell system 1 due to independence from high-voltage supply of the drive unit 20; an emergency operation (limp home) is possible solely by means of the low-voltage supply of the second drive unit 25.

Improved overall system dynamic of the fuel cell system 1 due to higher air system dynamic, since due to the oxidizing agent the supply of the fuel cell 2 becomes more dynamic.

Lower system costs due to the reduced dynamic requirements demanded of the drive unit 20.

The two compressors 11, 12 used—optionally also the third compressor 15—can be optimally designed in respect of their dynamic and continuous operation.

A platform-suitable and optimum design of the first compressor 11, operated with the high-voltage drive unit 20, is possible with respect to the voltage state.

The second drive unit 25 is capable of accelerating the second compressor unit 102 even when there is not yet any pressure on the exhaust gas turbine 13. As a result, the dynamic requirement demanded of the first compressor unit 101 is reduced or the dynamic of the turbocompressor 10 as a whole is improved. In particular, the dynamic demands on the first compressor 11 and on the first compressor unit 101 are significant cost factors due to the dimensioning of the power electronics. The dynamic of the air supply or the supply of oxidizing agent to the fuel cell 2 in turn has a direct limiting effect on the dynamic of the fuel cell system 1. An inadequate dynamic of the fuel cell system 1 for the electrical drive of a fuel cell vehicle would in turn be a reason for using hybridization batteries. An increase in the dynamic of the fuel cell system 1 therefore also reduces any demands on a hybridization battery.

The design of the second drive unit 25 does not have to be thermally stable. An embodiment without active cooling is conceivable, since the second drive unit 25 in most embodiments is used primarily for running up the turbo compressor 10. This has advantages in terms of the system design, because it obviates the need for any attachment to cooling circuits of the fuel cell system 1 and a very high power density can be selected for the second drive unit 25. This in turn has advantages in the designing of the second drive unit 25, preferably embodied as an electric motor: relatively little material used (copper, magnetic materials). The use of simple brushless DC machines or even simple mechanically commutated machines is feasible. A characteristic feature of the latter is their very low costs.

In advantageous developments the embodiment in FIG. 7 also comprises a bearing line 243 for supplying the shaft bearings 241, 242 of the second shaft 24 with hydraulic fluid, as has been described in the embodiments in FIG. 3 and FIG. 4. Generally this is advantageous, provided that the first compressor 11 and the second compressor 12 are connected in series.

What is claimed is:

1. A turbo compressor (10) having a first compressor unit (101) and a second compressor unit (102), wherein the first compressor unit (101) comprises a first compressor (11) arranged on a first shaft (14) driven by a drive unit (20), wherein the second compressor unit (102) comprises a second compressor (12) and an exhaust gas turbine (13), and wherein the second compressor (12) and the exhaust gas turbine (13) are arranged on a second shaft (24),
wherein the first compressor (11) and the second compressor (12) are connected in series,
wherein the second shaft (24) is supported by at least one shaft bearing (241, 242),
wherein the first compressor (11) and the second compressor (12) are arranged in an air feed line (3),
wherein, between the first compressor (11) and the second compressor (12), a bearing line (243) branches off from the air feed line (3) to supply the shaft bearing (241, 242) with fluid pressure, and
wherein a bearing line valve (244) is arranged in the air feed line (3) between the second compressor (12) and a point where the bearing line (243) branches off.

2. The turbo compressor (10) as claimed in claim 1, characterized in that the second shaft (24) is configured to be driven by a second drive unit (25).

3. The turbo compressor (10) as claimed in claim 2, characterized in that the first drive unit (20) is embodied as a high-voltage electric motor and the second drive unit (25) as a low-voltage electric motor.

4. The turbo compressor (10) as claimed in claim 2, characterized in that the first drive unit (20) is embodied as a low-voltage electric motor and the second drive unit (25) as a high-voltage electric motor.

5. The turbo compressor (10) as claimed in claim 1, characterized in that a heat exchanger (19) is arranged between the first compressor (11) and the second compressor (12).

6. The turbo compressor (10) as claimed in claim 1, characterized in that a compressed-air brake is arranged on the second shaft (24), wherein the compressed-air brake is connected to the bearing line (243).

7. The turbo compressor (10) as claimed in claim 1, characterized in that the air feed line (3) is an air feed line (3) of a fuel cell system (1), and that the exhaust gas turbine (13) is arranged in an exhaust line (4) of the fuel cell system (1).

8. The turbo compressor (10) as claimed in claim 1, characterized in that a third compressor (15) is arranged on the first shaft (14).

9. The turbo compressor (10) as claimed in claim 8, characterized in that the first compressor (11) and the third compressor (15) are connected in parallel.

10. The turbo compressor (10) as claimed in claim 8, characterized in that the first compressor (11) and the third compressor (15) are connected in series.

11. The turbo compressor (10) as claimed in claim 8, wherein the air feed line (3) is an air feed line (3) of a fuel cell system (1), characterized in that the first compressor (11), the second compressor (12), and the third compressor (15) are arranged in the air feedline (3) of the fuel cell system (1) and that the exhaust gas turbine (13) is arranged in an exhaust line (4) of the fuel cell system (1).

12. The turbo compressor (10) as claimed in claim 1, characterized in that a compressor bypass valve (16) is arranged in parallel with the second compressor (12).

13. The turbo compressor (10) as claimed in claim 1, characterized in that an exhaust bypass valve (16) is arranged in parallel with the exhaust gas turbine (13).

14. A fuel cell system (1) comprising a turbo compressor (10) as claimed in claim 1, a fuel cell (2), an air feed line (3) for feeding an oxidizing agent into the fuel cell (2), and an exhaust line (4) for discharging the oxidizing agent from the fuel cell (2), wherein the compressor (11) and the second compressor (12) are arranged in the air feed line (3) and wherein the exhaust gas turbine (13) is arranged in the exhaust line (4).

15. A method for starting a fuel cell system (1) comprising a turbo compressor (10) as claimed in claim 1, a fuel cell (2), and an exhaust line (4) for discharging the oxidizing agent from the fuel cell (2), wherein the method comprises the following steps:
  closing the bearing line valve (244) or keeping the bearing line valve (244) closed,
  starting delivery of the oxidizing agent in the air feed line (3) due to starting of the drive unit (20), and
  opening bearing line valve (244) when a minimum pressure in the shaft bearing (241, 242) is reached.

16. A method for stopping a fuel cell system (1), wherein the fuel cell system (1) comprises a turbo compressor (10) as claimed in claim 1, a fuel cell (2), and an exhaust line (4) for discharging the oxidizing agent from the fuel cell (2), wherein the method comprises the following steps:
  closing the bearing line valve (244), and
  stopping the drive unit (20) when the speed of the second shaft (24) falls below a speed limit.

17. A method for starting a fuel cell system (1), wherein the fuel cell system (1) comprises a turbo compressor (10) as claimed in claim 1, a fuel cell (2), and an exhaust line (4) for discharging the oxidizing agent from the fuel cell (2), wherein a compressor bypass valve (16) is arranged in parallel with the second compressor (12), wherein an exhaust bypass valve (17) is arranged in parallel with the exhaust gas turbine (13), and wherein the method comprises the following steps:
  opening the compressor bypass valve (16) and the exhaust bypass valve (17) or keeping the compressor bypass valve (16) and the exhaust bypass valve (17) opened,
  starting delivery of the oxidizing agent in the air feed line (3) due to starting of the drive unit (20), and
  closing the compressor bypass valve (16) and the exhaust bypass valve (17) when a minimum pressure in the shaft bearing (241, 242) is reached.

18. A method for stopping a fuel cell system (1), wherein the fuel cell system (1) comprises a turbo compressor (10) as claimed in claim 1, a fuel cell (2), and an exhaust line (4) for discharging the oxidizing agent from the fuel cell (2), wherein a compressor bypass valve (16) is arranged in parallel with the second compressor (12), wherein an exhaust bypass valve (17) is arranged in parallel with the exhaust gas turbine (13), and wherein the method comprises the following steps:
  opening the compressor bypass valve (16) and the exhaust bypass valve (17), and
  stopping the drive unit (20) when the speed of the second shaft (24) falls below a speed limit.

* * * * *